US010049259B2

(12) United States Patent
Zhang (10) Patent No.: US 10,049,259 B2
(45) Date of Patent: *Aug. 14, 2018

(54) FINGERPRINT MODULE, METHOD FOR FABRICATING THE SAME, AND MOBILE TERMINAL (71) Applicant: Guangdong Oppo Mobile Telecommunications Corp., Ltd., Dongguan (CN)

(72) Inventor: Wenzhen Zhang, Dongguan (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/834,065

(22) Filed: Dec. 7, 2017

(65) Prior Publication Data
US 2018/0096189 A1 Apr. 5, 2018

Related U.S. Application Data (63) Continuation of application No. 15/690,277, filed on Aug. 30, 2017.

(30) Foreign Application Priority Data

Aug. 30, 2016 (CN) .......................... 2016 1 0771828

(51) Int. Cl.
G06K 9/20 (2006.01)
G06K 9/00 (2006.01)
G06F 21/32 (2013.01)

(52) U.S. Cl.
CPC ......... *G06K 9/00087* (2013.01); *G06F 21/32* (2013.01); *G06K 9/00053* (2013.01)

(58) Field of Classification Search
CPC .............................. G06K 9/00013–2009/0006
See application file for complete search history.

(56) References Cited

U.S. PATENT DOCUMENTS 6,836,953 B2 * 1/2005 Fries ................... A61B 5/1172
29/592.1
2003/0013328 A1 1/2003 Andrade
(Continued)

FOREIGN PATENT DOCUMENTS

CN 205121583 3/2015
CN 104779221 7/2015
(Continued)

OTHER PUBLICATIONS

Notification of Office Action dated Oct. 11, 2017 From the State Intellectual Property Office of the People's Republic of China Re. Application No. 201610771828.6 and Its Translation into English. (6 Pages).

*Primary Examiner* — Brian P Werner (57) ABSTRACT

Disclosed are a fingerprint module, a method for fabricating the same, and a mobile terminal. The fingerprint module has a fingerprint chip and a circuit board. The fingerprint chip has an identifying surface and a connecting surface opposite to the identifying surface, wherein the identifying surface is configured to identify a fingerprint of a user. The circuit board is attached to the connecting surface, wherein a sealing adhesive is disposed between the circuit board and the fingerprint chip.

18 Claims, 12 Drawing Sheets (56) References Cited

U.S. PATENT DOCUMENTS

| | | | | |
|---|---|---|---|---|
| 2009/0184408 | A1* | 7/2009 | Okada | G06K 9/0002 257/680 |
| 2014/0205161 | A1* | 7/2014 | Salatino | G06K 9/00053 382/124 |
| 2015/0071509 | A1* | 3/2015 | Myers | G06K 9/0002 382/124 |
| 2016/0131505 | A1* | 5/2016 | Rao | G06K 9/0002 73/431 |
| 2018/0060645 | A1 | 3/2018 | Zhang | |

FOREIGN PATENT DOCUMENTS

| | | |
|---|---|---|
| CN | 105046190 | 11/2015 |
| CN | 105095861 | 11/2015 |
| CN | 105205473 | 12/2015 |
| CN | 105224926 | 1/2016 |
| CN | 205080565 | 3/2016 |
| CN | 105631421 | 6/2016 |
| CN | 205302318 | 6/2016 |
| CN | 205486167 | 8/2016 |
| CN | 106127195 | 11/2016 |
| WO | WO 02/095801 | 11/2002 |

* cited by examiner

FINGERPRINT MODULE, METHOD FOR FABRICATING THE SAME, AND MOBILE TERMINAL

RELATED APPLICATIONS

This application is a Continuation of U.S. patent application Ser. No. 15/690,277 filed on Aug. 30, 2017, which claims the benefit of priority of Chinese Patent Application No. 201610771828.6, filed on Aug. 30, 2016. The contents of the above applications are all incorporated by reference as if fully set forth herein in their entirety.

FIELD AND BACKGROUND OF THE INVENTION

The present disclosure relates to electronic equipment, and more particularly to a fingerprint module, a method for fabricating the same, and a mobile terminal.

Fingerprint identifying modules are more and more widely used in mobile phones. Typically, a fingerprint module includes a fingerprint chip and a circuit board electrically connected to the fingerprint chip. However, most circuit boards and fingerprint chips cannot be completely integrated, resulting in poor sealing between the circuit boards and the fingerprint chips, causing easy corrosion, contamination, or impurity mixing of the circuit board and the fingerprint chip therebetween, thus resulting in damage of the fingerprint module. Therefore, safety of the fingerprint module is decreased.

BRIEF DESCRIPTION OF THE SEVERAL VIEWS OF THE DRAWINGS

In order to more clearly describe embodiments of the present disclosure or technical solutions in a conventional technology, drawings required to be used for the embodiments or descriptions of the conventional technology are simply described hereinafter. Apparently, the drawings described below only illustrate some embodiments of the present disclosure. Those skilled in the art can obtain other drawings based on these drawings disclosed herein without creative effort.

DESCRIPTION OF THE SPECIFIC EMBODIMENTS OF THE INVENTION

The technical solutions in the embodiments of the present disclosure will be described in the following with reference to the accompanying drawings in the embodiments of the present disclosure in a clear and complete manner.

Figure 1:
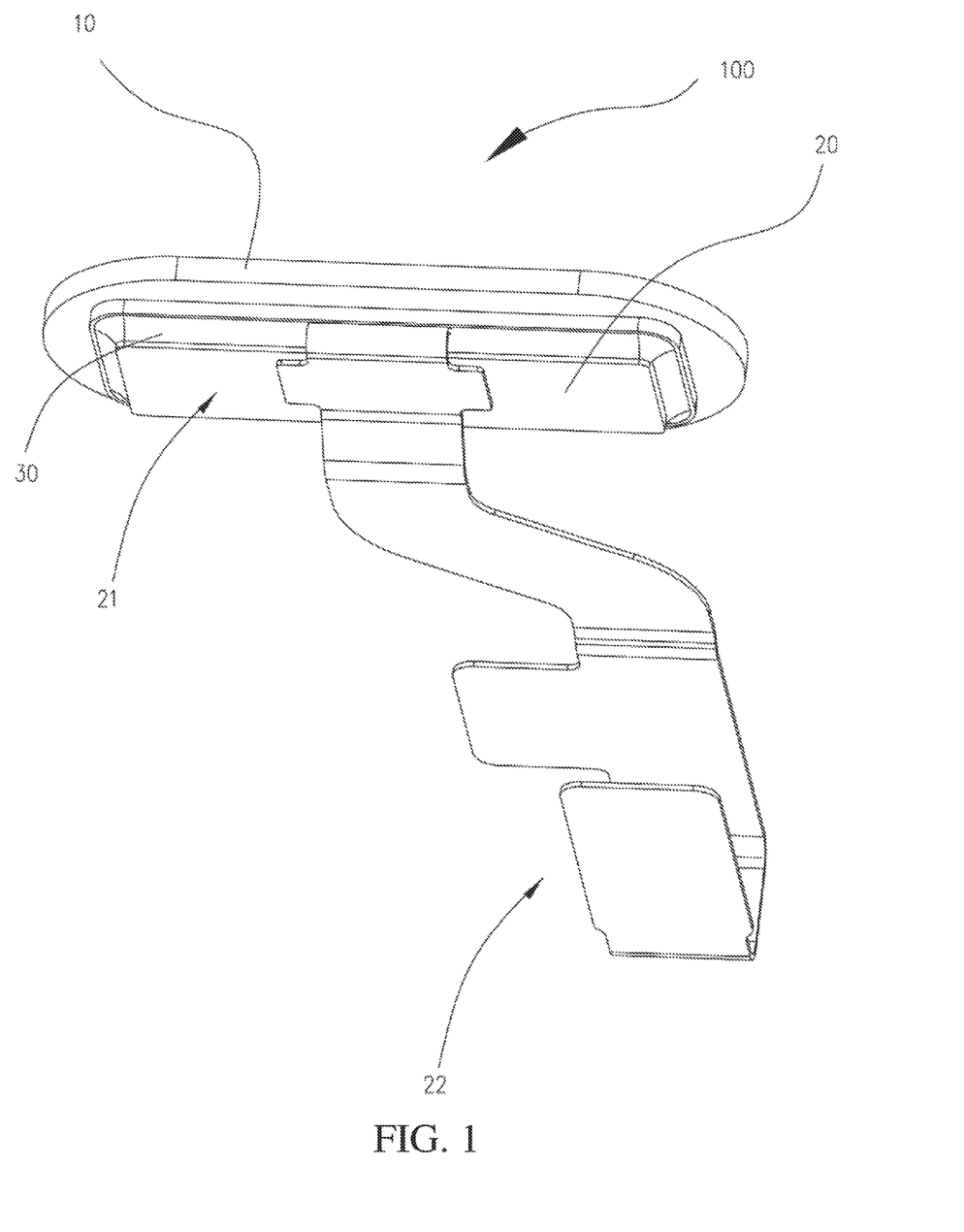
FIG. 1 is a schematic diagram illustrating a fingerprint module according to a first embodiment of the present disclosure.
Figure 2:
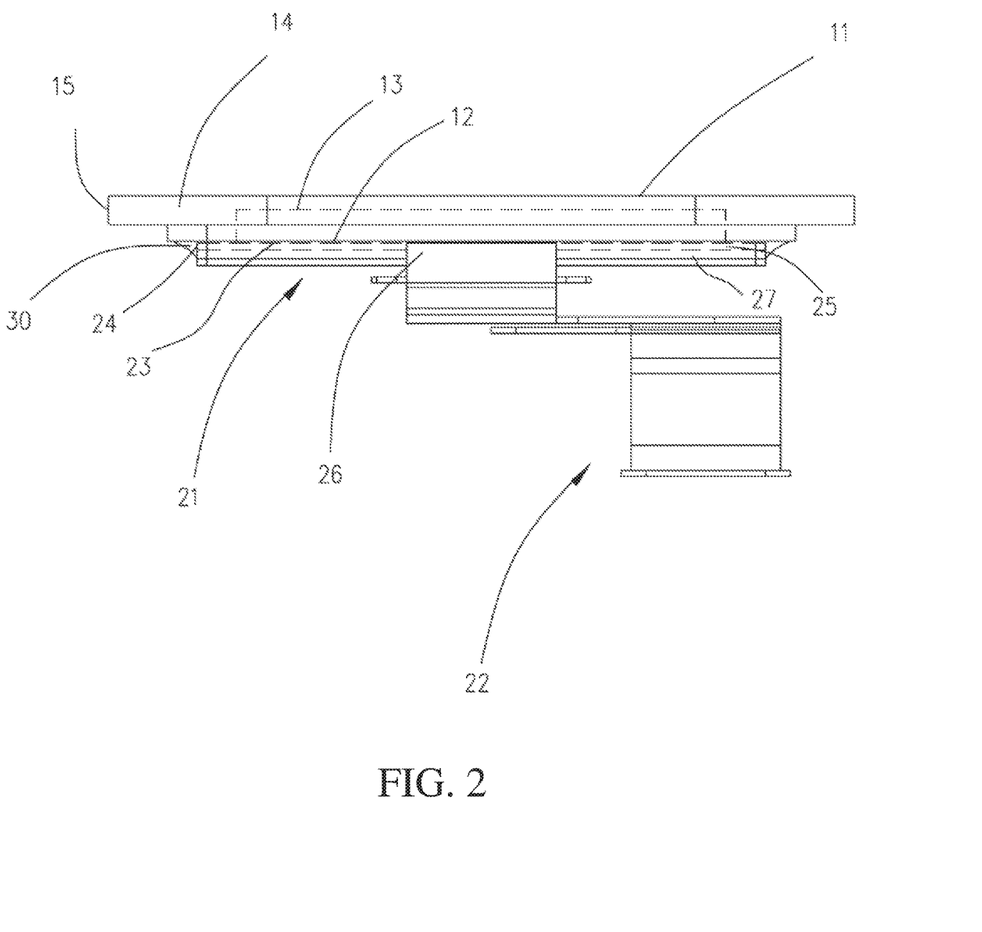
FIG. 2 is a cross-sectional schematic diagram of the fingerprint module in FIG. 1.

FIG. 1 and FIG. 2 illustrate a fingerprint module 100 of an embodiment of the present disclosure. The fingerprint module 100 includes a fingerprint chip 10 and a circuit board 20. The fingerprint chip 10 includes an identifying surface 11 and a connecting surface 12 opposite to the identifying surface 11. The identifying surface 11 is configured to identify a fingerprint of a user. The circuit board 20 is coupled to the connecting surface 12, wherein a sealing adhesive 30 is positioned between the circuit board 20 and the fingerprint chip 10. It can be understood that the fingerprint module 100 is applied in a mobile terminal 200 (illustrated in FIG. 12). The mobile terminal 200 can be a mobile phone, a computer, a tablet computer or a laptop.

By attaching the circuit board 20 to the connecting surface 12 and disposing a sealing adhesive 30 between the circuit board 20 and the fingerprint chip 10, a sealed environment for the circuit board 20 and the fingerprint chip 10 is provided, so as to prevent the circuit board 20 and the fingerprint chip 10 therebetween, from being corroded, contaminated, or mixed with impurities. Therefore, safety of the fingerprint module 100 is improved.

Figure 3:
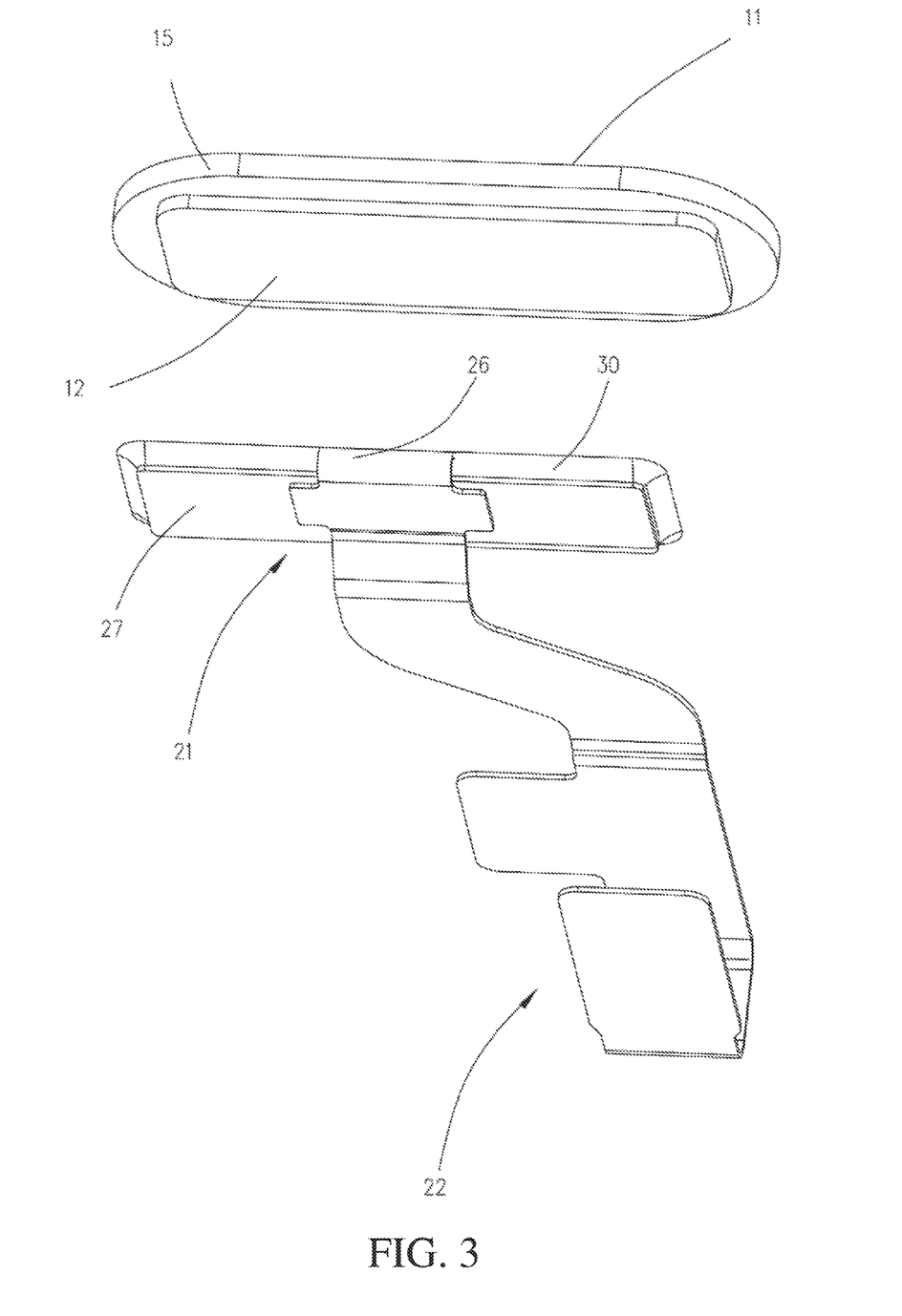
FIG. 3 is an exploded schematic diagram of the fingerprint module in FIG. 1.
Figure 4:
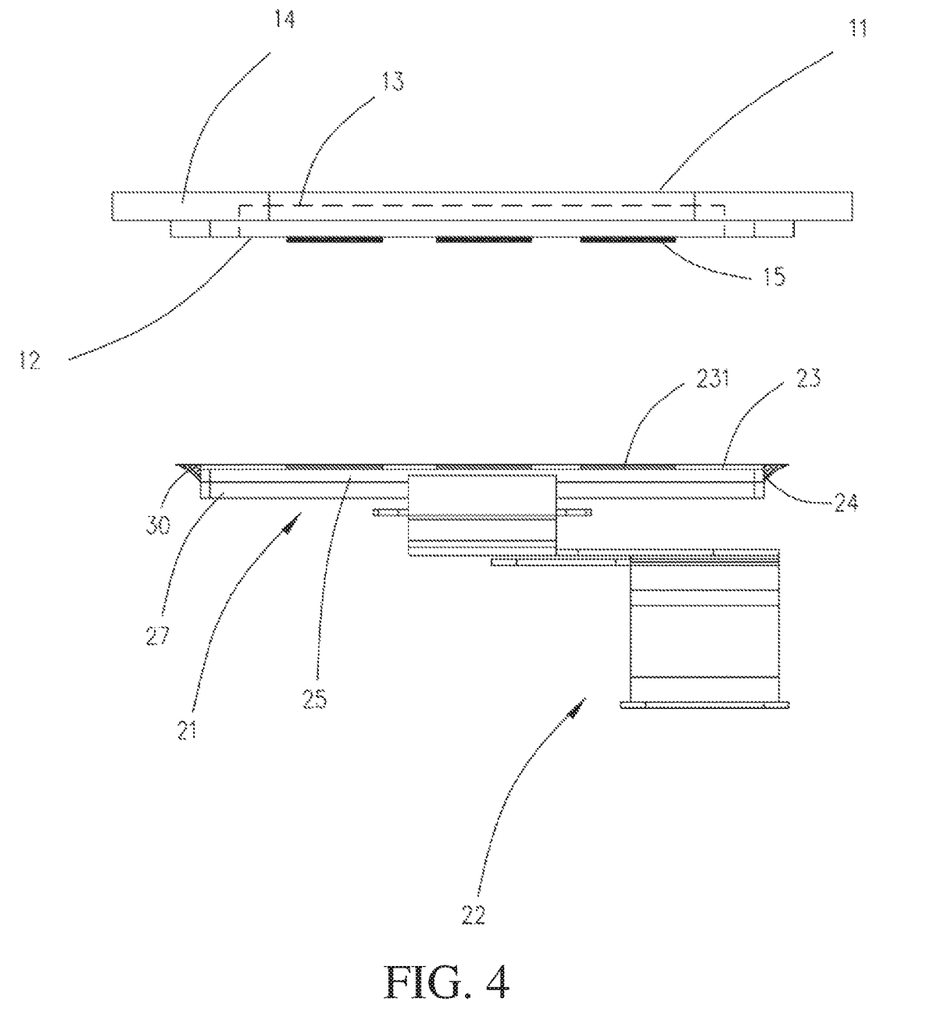
FIG. 4 is a cross-sectional schematic diagram of the fingerprint module in FIG. 3.

FIG. 3 and FIG. 4 illustrate that in an embodiment, the fingerprint chip 10 can be an elliptical plate. It can be understood that the fingerprint chip 10 is fixed onto a case 101 of the mobile terminal 200 (illustrated in FIG. 12). The fingerprint chip 10 can be directly fixed to the case 101 and can be also indirectly fixed to the case 101 by other members. In one embodiment, an assembly hole 102 (illustrated in FIG. 12) is disposed in the case 101, and the fingerprint chip 10 can be fixed to the assembly hole 102 by the decorative ring 40 (illustrated in FIG. 12). For example, the fingerprint chip 10 can be fixed to an inner sidewall of the assembly hole 102 by the decorative ring 40, such that the fingerprint chip 10 is fixed to the case 101 indirectly. In some embodiments, a gap between the fingerprint chip 10 and the decorative ring 40 is sealed by using an adhesive 412 (illustrated in FIG. 12), so as to fix the fingerprint chip 10 to the decorative ring 40. Specifically, the fingerprint chip 10 includes a chip 13 and an encapsulating material 14 covering a periphery of the chip 13. The chip 13 exposes the connecting surface 12 so as to facilitate an electrical connection with the circuit board 20. The chip 13 is configured to receive a user fingerprint information. The fingerprint chip 10 further includes a side surface 15 disposed on the encapsulating material 14, and the side surface 15 is connected to the identifying surface 11. It can be understood that the connecting surface faces away from the user, and the chip 13 is electrically connected to the circuit board 20 by the connecting surface 12 and is further electrically connected to a motherboard 201 of the mobile terminal 200 by the circuit board 20. In some embodiments, the fingerprint chip 10 may also be in a circular plate shape. In some embodiments, the fingerprint chip 10 can be further located at an inner side of the case 101 (illustrated in FIG. 12). The case 101 can be used as an encapsulating cover plate of the fingerprint chip 10. The fingerprint chip 10 is configured to obtain a user fingerprint by the case 101.

In some embodiments, the circuit board 20 is electrically connected to the chip 13 of the fingerprint chip 10 and obtains an electrical signal of the user fingerprint from the chip 13. When the fingerprint module 100 is applied in the mobile terminal 200 (illustrated in FIG. 12), the circuit board 20 is further connected to the motherboard 201 (illustrated in FIG. 12) of the mobile terminal 200, and delivers the electrical signal of the user fingerprint of the chip 13 to the motherboard 201, thereby achieving the user to input a fingerprint touch instruction. Specifically, the circuit board 20 includes a first end 21 and a second end 22 opposite to the first end 21. The second end 22 is electrically connected to the motherboard 201 of the mobile terminal 200. The first end 21 is attached to the connecting surface 12 of the fingerprint chip 10, and the second end is away from the connecting surface 12. In some embodiments, circuits can be disposed on two surface of the circuit board 20, and the circuit board 20 is directly laminated on the motherboard 201 of the mobile terminal 200.

In some embodiments, the sealing adhesive 30, the sealing adhesive 30 has performance of waterproofing, anti-corrosion, and barrier. The sealing adhesive 30 can be added between the circuit board 20 and the fingerprint chip 10 by dispensing or coating. Specifically, the sealing adhesive 30 can be disposed on the circuit board 20 and a peripheral side of the fingerprint chip 10 is sealed by the sealing adhesive 30; or the sealing adhesive 30 can be disposed on the connecting surface 12 of the fingerprint chip 10 and a peripheral side of the circuit board 20 is sealed by the sealing adhesive 30. Further, the connecting surface 12 and a surface of the circuit board 20 coupled to the connecting surface 12 can be sealed by the sealing adhesive 30. A sealed environment for the circuit board 20 and the fingerprint chip 10 is provided by using the sealing adhesive 30, thereby ensuring the circuit board 20 electrically connected to the fingerprint chip 10 stably and ensuring structural safety of the fingerprint module 100.

Further, the circuit board 20 includes: a conductive surface 23 coupled to the connecting surface 12; and a peripheral side surface 24 connected to a peripheral edge of the conductive surface 23, wherein an orthographic projection of the conductive surface 23 is located in the connecting surface 12, and the sealing adhesive 30 is disposed between the connecting surface 12 and at least one of the conductive surface 23 and the peripheral side surface 24.

In some embodiments, the circuit board 20 is covered with the fingerprint chip 10. In order to facilitate a support of a peripheral edge of the fingerprint chip 10, the circuit board 20 is partly laminated on the connecting surface 12 of the fingerprint chip 10. A region of a peripheral edge of the connecting surface 12 is required to be emptied so as to support the peripheral edge of the connecting surface 12. Therefore, the fingerprint chip 10 can be supported so as to avoid the fingerprint chip 10 being damaged due to pressing or so as to avoid the fingerprint chip 10 detaching from the case 101 (illustrated in FIG. 12). Specifically, the conductive surface 23 and the peripheral side surface 24 are both disposed on the first end 21 of the circuit board 20. A plurality of solder pads 231 are disposed on the conductive surface 23, and a plurality of pins 15 (black parts in FIG. 4) electrically connected to the chip 13 are located on the connecting surface 12. The plurality of pins 15 are corresponding to and contacts the plurality of solder pads 231 (grey parts in FIG. 4), so as to achieve the circuit board 20 electrically connected to the fingerprint chip 10. The sealing adhesive 30 covers a periphery of the plurality of pins 15 and the plurality of solder pads 231, so as to provide a sealed environment for the plurality of pins 15 and the plurality of solder pads 231. Therefore, the circuit board 20 and the fingerprint chip 10 are protected to improve safety of the fingerprint module 100. It can be understood that, the sealing adhesive 30 can be disposed between the conductive surface 23 and the connecting surface 12 to cover with the pins 15 and the solder pads 231. The sealing adhesive 30 can be also disposed at a corner between the connecting surface 12 and the peripheral side surface 24 so as to cover the plurality of pins 15 and the plurality of solder pads 231. Further, the sealing adhesive 30 can be disposed simultaneously between the conductive surface 23 and the connecting surface 12, and disposed at the corner between the connecting surface 12 and the peripheral side surface 24.

In some embodiments, the sealing adhesive 30 is an insulating adhesive. The sealing adhesive 30 is disposed at a corner between the peripheral side surface 24 and the connecting surface 12. Specifically, the conductive surface 23 of the circuit board 20 is attached onto the connecting surface 12, and the solder pads 231 of the conductive surface 23 is closely connected to the pins 15 of the connecting surface 12. Then, the sealing adhesive 30 is added to a periphery of the circuit board 20 using surface mount technology (SMT), i.e., the sealing adhesive 30 is added to a corner between the connecting surface 12 and the peripheral side surface 24, so as to seal a peripheral side of the pins 15 and a peripheral side of the solder pads 231 by the sealing adhesive 30. In some embodiments, the sealing adhesive 30 can be further extended from the corner being between the connecting surface 12 and the peripheral side surface 24 to a location being between the connecting surface 12 and the conductive surface 23.

Figure 5:
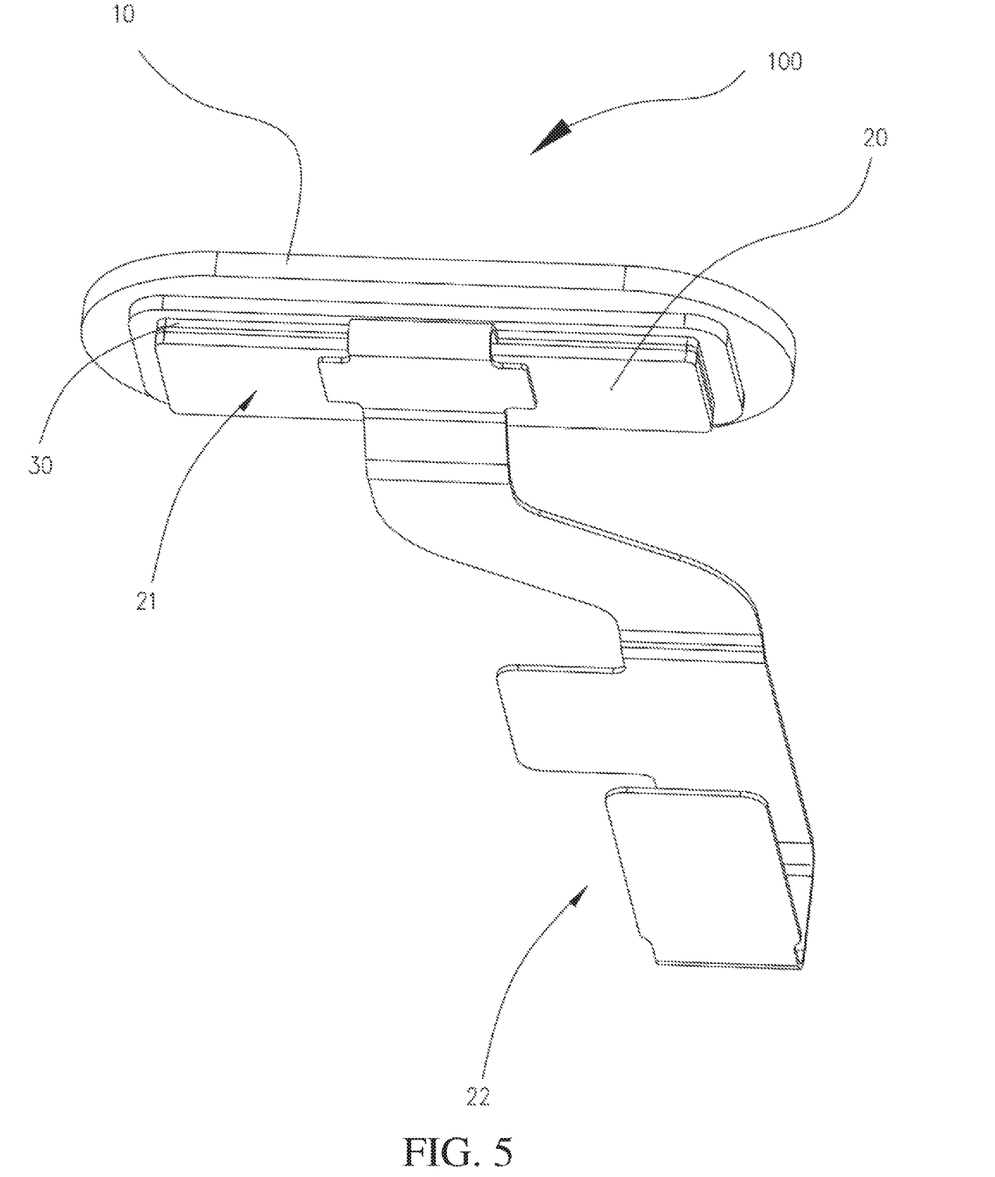
FIG. 5 is a schematic diagram illustrating a fingerprint module according to a second embodiment of the present disclosure.
Figure 6:
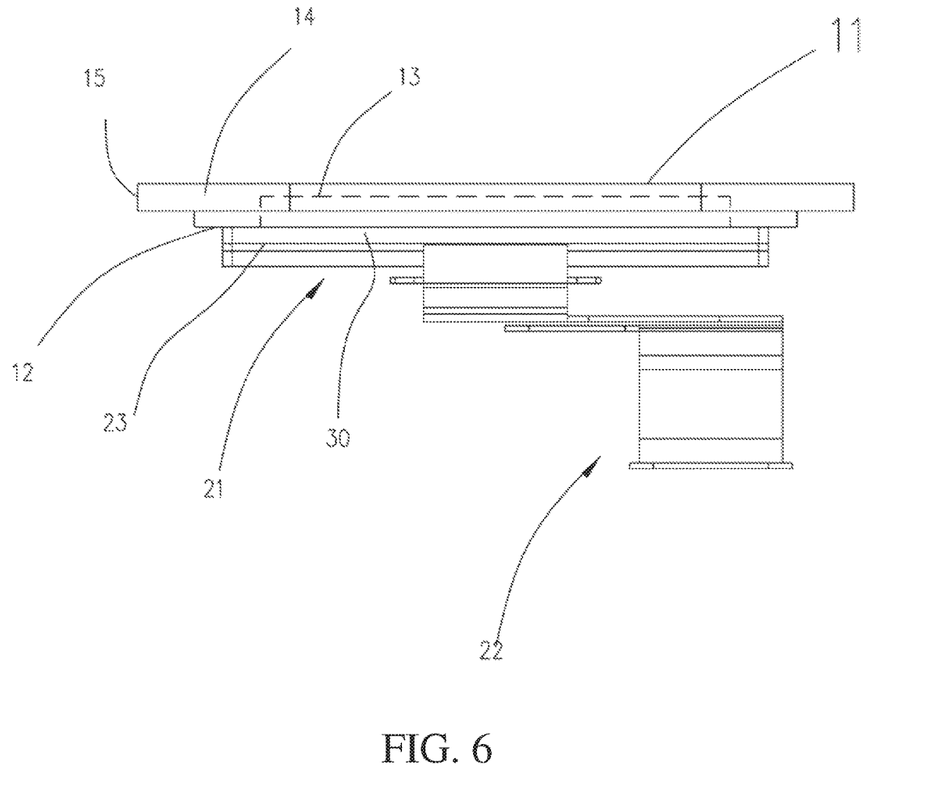
FIG. 6 is a front view of the fingerprint module in FIG. 5.
Figure 7:
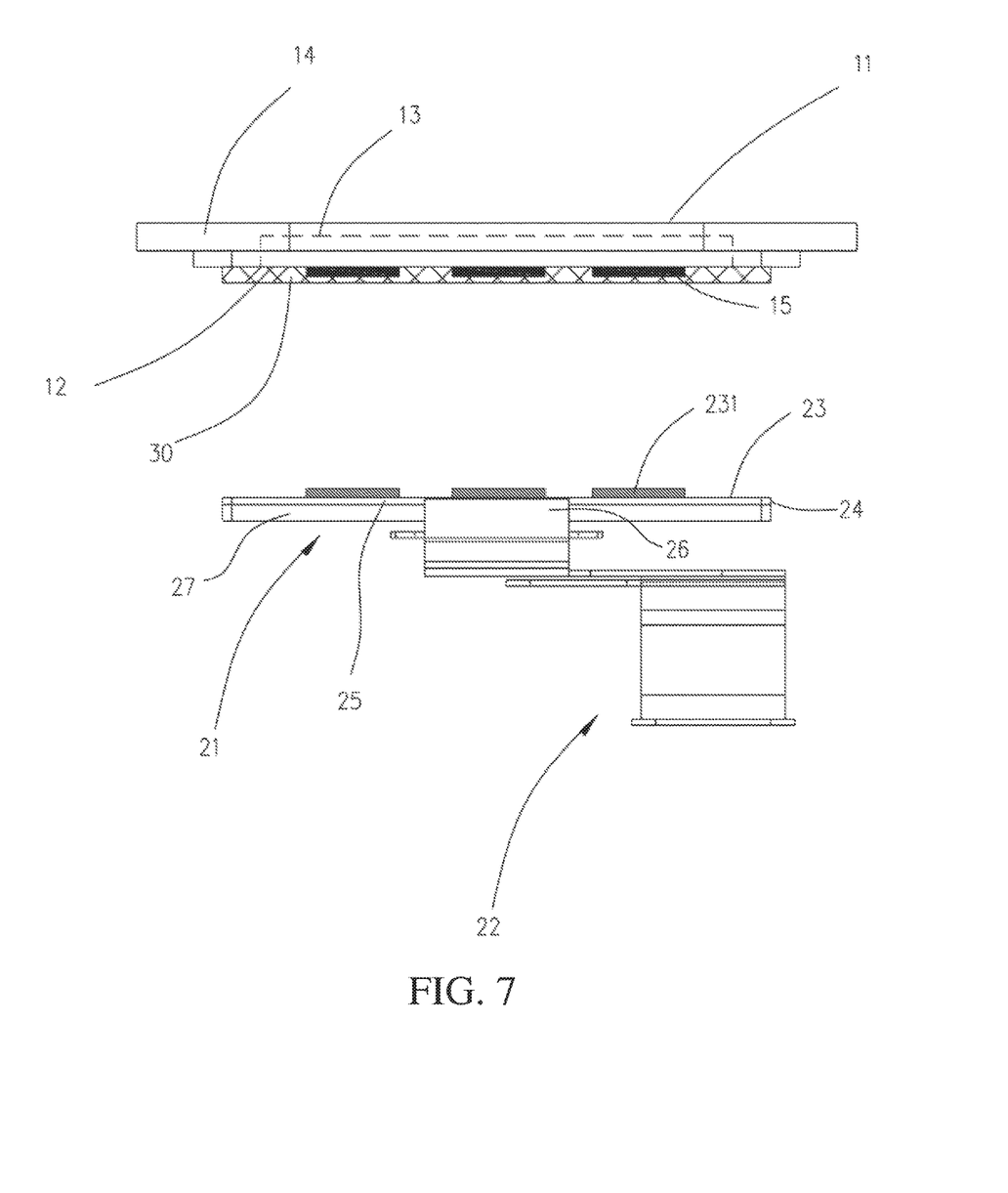
FIG. 7 is an exploded schematic diagram of the fingerprint module in FIG. 6.

FIG. 5, FIG. 6 and FIG. 7 illustrate that in some embodiments, the sealing adhesive 30 is a conductive adhesive. The sealing adhesive 30 is disposed between the conductive surface 23 and the connecting surface 12. Specifically, when the circuit board 20 is not attached to the connecting surface 12, the sealing adhesive 30 is coated on the connecting surface 12 by an anisotropic conductive film (ACF) process. Then, a first end 21 of the circuit board 20 is pressed on the sealing adhesive 30, so as to subject the sealing adhesive 30 to covering the peripheral side of the pins 15 and an end surface of the pins 15 simultaneously, and to subject the sealing adhesive 30 to covering the peripheral side of the solder pads 231 and an end surface of the solder pads 231 simultaneously. Since the sealing adhesive 30 is specifically conductive in a direction perpendicular to the end surface of the pins 15, the sealing adhesive 30 is in conduction with the pins 15 and the solder pads 231, and the sealing adhesive 30 has a protective effect on the pins 15 and the solder pads 231. Of course, in some embodiments, the sealing adhesive 30 can be squeezed to the corner between the peripheral side surface 24 and the connecting surface 12; the fingerprint chip 10 can also be pressed on the first end 21 of the circuit board 20 after coating the sealing adhesive 30 on the conductive surface 23; or the fingerprint chip 10 and the circuit board 20 are pressed to each other after coating the sealing adhesive 30 on both of the conductive surface 23 and the connecting surface 12.

Further, FIG. 1, FIG. 3 and FIG. 4 illustrate that in some embodiment, the circuit board 20 includes: a connecting layer 25 attached to the connecting surface 12; and an extending layer 26 fixed to a peripheral edge of the connecting layer 25, wherein the conductive surface 23 and the peripheral side surface 24 are both disposed on the connecting layer 25, and the extending layer 26 passes through the sealing adhesive 30 located at the peripheral edge of the connecting layer 25, so as to be electrically connected to an external member.

In some embodiments, the connecting layer 25 is disposed on the first end 21, and the extending layer 26 is disposed between the first end 21 and the second end 22. Since the connecting layer 25 is attached to the connecting surface 12, the solder pads 231 is disposed on the connecting layer 25, and the connecting layer 25 is electrically connected to the fingerprint chip 20 via the solder pads 231. The extending layer 26 is extended outwardly from the peripheral edge of the connecting layer 25, i.e., the extending layer 26 is extended outwardly from the peripheral side surface 24, so as to facilitate the second end 22 connected to the motherboard 201 (illustrated in FIG. 12) of the mobile terminal 200 (illustrated in FIG. 12). Since the sealing adhesive 30 is disposed at the corner between the peripheral side surface 24 and the connecting surface 12, the extending layer 26 passes through the sealing adhesive 30, such that the sealing adhesive 30 is not separated by the extending layer 26, so as to ensure the circuit board 20 electrically connected to the motherboard 201, and to ensure a sealing performance between the circuit board 20 and the fingerprint chip 10. Safety of the fingerprint module 100 is improved.

Further, in some embodiments, the circuit board 20 is a flexible printed circuit board. The circuit board 20 further includes a reinforcement layer 27 is attached to a side of the connecting layer 25 opposite to the fingerprint chip 10.

In some embodiments, the reinforcement layer 27 is a steel plate. The reinforcement layer 27 is attached onto the connecting layer 26, and a length and width dimension of the reinforcement layer 27 is identical to that of the connecting layer 25. The connecting layer 25 is supported by the reinforcement layer 27 for increasing a hardness of the first end 21 of the circuit board 20, so as to prevent the first end 21 of the circuit board 20 from breaking. The extending layer 26 is bent with respect to the connecting layer 25, so as to decrease an overall occupying space of the fingerprint module 100 and to facilitate the second end 22 connected with the motherboard 201 (illustrated in FIG. 12). In some embodiments, the reinforcement layer 27 can further be a resin plate.

FIG. 5, FIG. 6 and FIG. 7 illustrate that in some embodiments, a structure of the circuit board 20 is substantially identical to that of the circuit board 20 in some embodiments illustrated in FIGS. 1-4. A difference is that, the extending layer 26 passes through the sealing adhesive 30 when the sealing adhesive 30 is squeezed to the corner between the peripheral side surface 24 and the connecting surface 12, so as to ensure a continuity of the sealing adhesive 30. Therefore, a sealing effect of the sealing adhesive 30 is improved.

Figure 8:
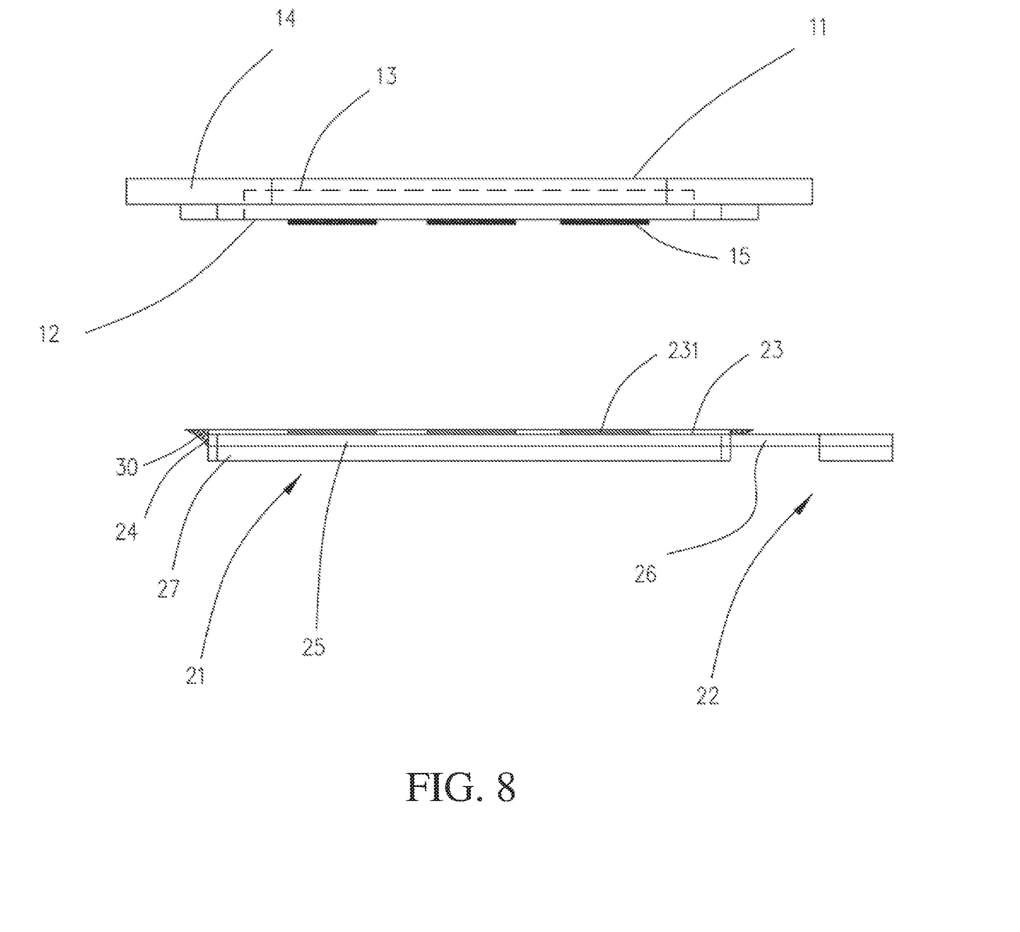
FIG. 8 is a schematic diagram illustrating a fingerprint module according to a third embodiment of the present disclosure.

FIG. 8 illustrates that in some embodiments is substantially identical to some embodiments illustrated in FIGS. 1-4. A difference is that, the circuit is a printed circuit board. The extending layer 26 is aligned with the connecting layer 25 so as to decrease a thickness of the fingerprint module 100 and stably support the fingerprint chip 10 by using a rigidity of the circuit board 20. In some embodiments, the circuit board 20 can further be replaced with a rigid-flex circuit board.

Figure 9:
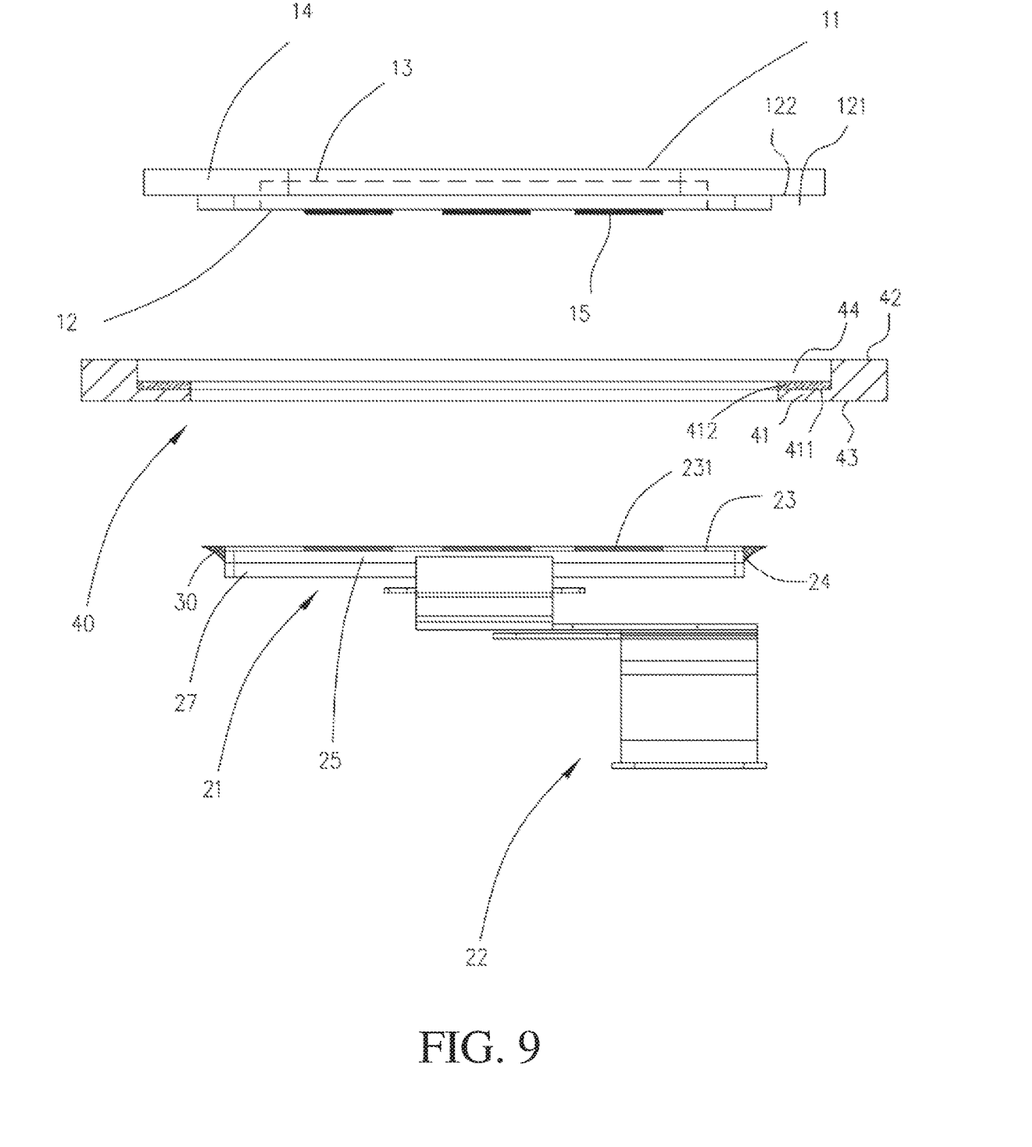
FIG. 9 is a schematic diagram illustrating a fingerprint module according to a first embodiment of the present disclosure.

Further, FIG. 9 illustrates that in some embodiment, the fingerprint module 100 (illustrated in FIG. 1) further includes a decorative ring 40, and a supporting table 41 is positioned on an inner side of the decorative ring 40, wherein a groove 121 fit to the supporting table 41 is defined in a peripheral edge of the connecting surface 12. It can be understood that, through providing stability to a peripheral edge of the fingerprint chip 10 by the decorative ring 40, the decorative ring 40 can be fixed to a case 101 (illustrated in FIG. 12) of the mobile terminal 200 (illustrated in FIG. 12), so as to facilitate to effectively combine the fingerprint chip 10 with the case 101.

In some embodiments, the decorative ring 40 is in an elliptical-ring shape. The decorative ring 40 is a metal element such that the decorative ring 40 provides better protection for the fingerprint chip 10. The decorative ring 40 includes a top surface 42 and a bottom surface 43 opposite to the top surface 42. The decorative ring 40 further includes an assembly hole 44 passing through the top surface 42 and the bottom surface 43. The fingerprint chip 10 is assembled in the assembly hole 44. Specifically, the supporting table 41 is disposed on an inner sidewall of the assembly hole 44 and adjacent to the bottom surface 43. The supporting table 41 includes a supporting surface 411 parallel to the bottom surface 43, so as to facilitate the fingerprint chip 10 to receive in the assembly hole 44. Further, the peripheral edge of the fingerprint chip 10 is supported by the supporting surface 411 of the supporting table 41, so as to fix the fingerprint chip 10 in the assembly hole 44. An outer sidewall of the fingerprint chip 10 is clearance-fitted to the inner sidewall of the assembly hole 44, so as to facilitate assembly of the fingerprint chip 10 in the assembly hole 44 and prevent the fingerprint chip 10 from rubbing against the assembly hole 44. Therefore, the fingerprint chip 10 is protected. The identifying surface 11 of the fingerprint chip 10 is received in the assembly hole 44 and adjacent to the top surface 42, so as to facilitate the identifying surface 11 to be touched by the user and to facilitate obtaining a fingerprint of the user. The groove 121 includes a contacting surface 122 parallel to the identifying surface 11. The contacting surface 122 is attached to the supporting surface 411, so as to stably fix the peripheral edge of the fingerprint chip 10 on the supporting table 41. Therefore, the fingerprint chip 10 and the decorative ring 40 are assembled with a stable structure. Adhesive 412 is adhered between the supporting table 41 and the groove 121. A gap between the fingerprint chip 10 and the decorative ring 40 is sealed by using the adhesive 412, so as to improve performance of waterproofing, anti-pollution, anti-impurities. Thus, safety of the fingerprint module 100 is improved. In some embodiments, through the peripheral edge of the connecting surface 12 having a clearance, it is convenient to process the groove 121 at the peripheral edge of the connecting surface 12 so as to facilitate fitting the groove 121 to the supporting table 41. Therefore, the fingerprint chip 10 is stably supported by the decorative ring 40. In some embodiments, the inner sidewall of the decorative ring 40 can further be attached to a peripheral sidewall of the fingerprint chip 10 by an engaging structure.

Figure 10:
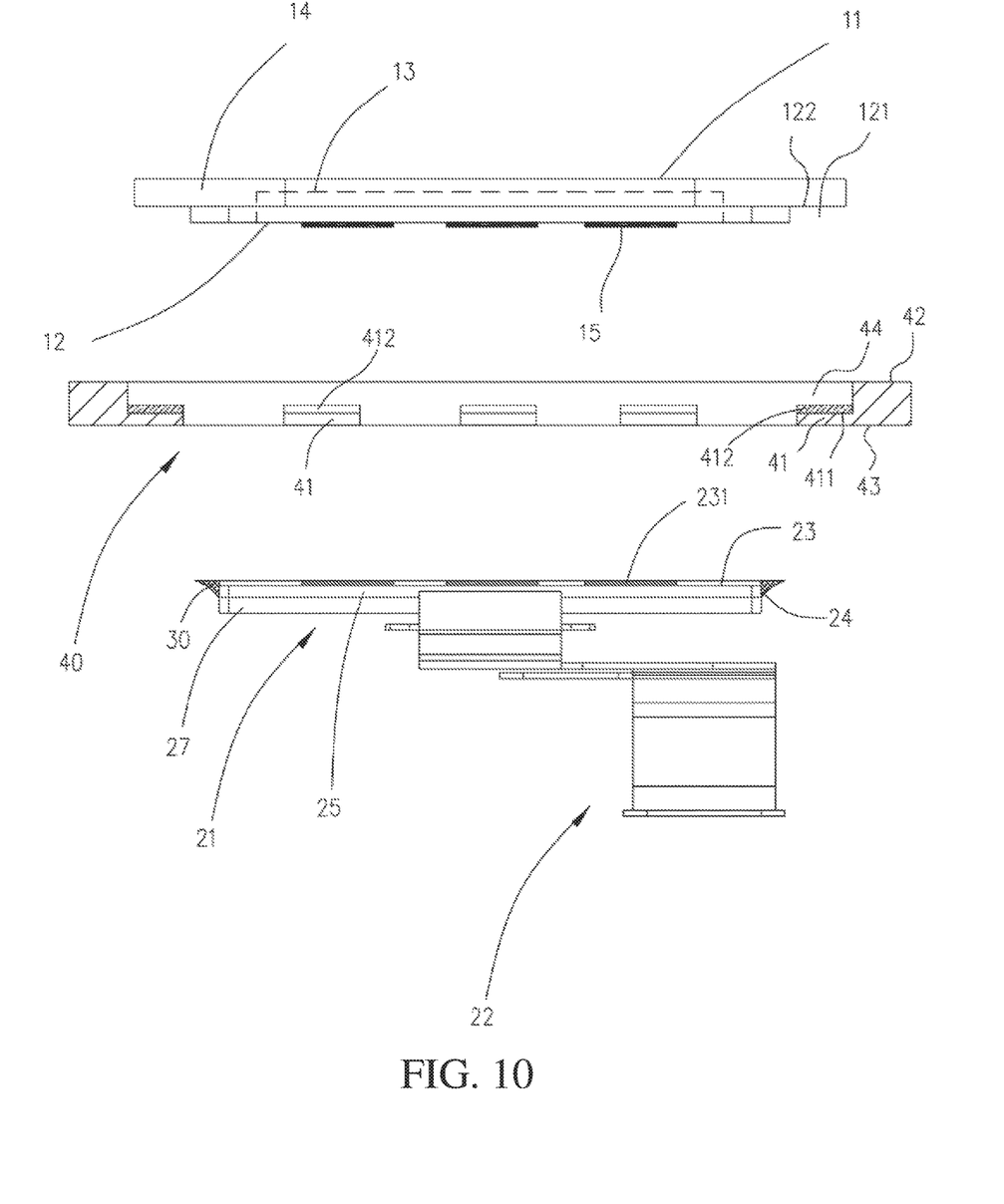
FIG. 10 is a schematic diagram illustrating a fingerprint module according to a fourth embodiment of the present disclosure.

FIG. 10 illustrates that some embodiments substantially identical to some embodiments illustrated in FIGS. 1-4. Differences are that, a plurality of the supporting tables 41 are disposed on an inner side of the decorative ring 40, the plurality of the supporting tables 41 are spaced apart from each other, a plurality of the grooves 121 are defined in the peripheral edge of the connecting surface 12, and the plurality of the grooves 121 are fit to the supporting tables 41. Specifically, the plurality of the supporting tables 41 are arranged equidistantly along the inner circumference of the assembly hole 44 so as to reduce production material of the decorative ring 40 and thereby reducing production cost of the fingerprint module 100. Further, the plurality of the grooves 121 are equidistantly arranged at the peripheral edge of the connecting surface 12. By providing the plurality of the grooves 121 on the peripheral edge of the fingerprint chip 10, a stress loss around the fingerprint chip 10 is reduced, thereby improving an anti-pressure performance of the fingerprint chip 10 and preventing the fingerprint chip 10 from being broken. Simultaneously, since the plurality of the grooves 121 are spaced apart from the peripheral edge of the connecting surface 12, the sealing adhesive 30 can be added in a region between the two neighboring grooves so that a sealed region of the sealing adhesive 30 is increased, i.e., a sealing performance of the sealing adhesive on the fingerprint chip 10 and the circuit board 20 is improved, and Safety of the fingerprint module 100 is raised.

Figure 11:
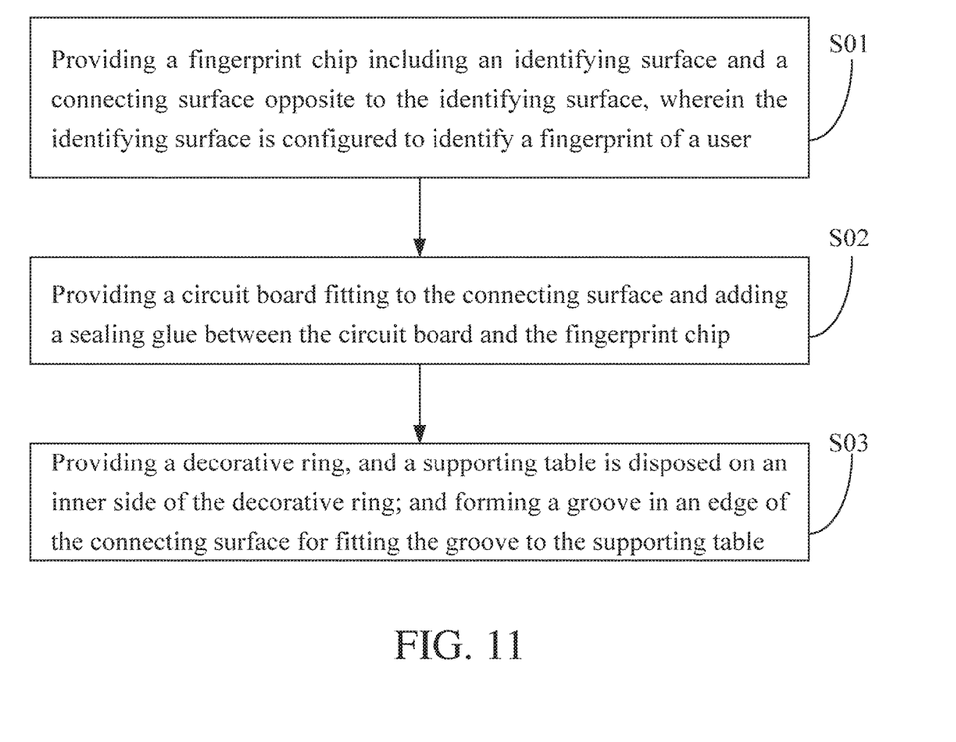
FIG. 11 is a flow chart illustrating a method for fabricating a fingerprint module according to the present disclosure.

The present disclosure further provides a method for fabricating a fingerprint module. FIG. 1, FIG. 9 and FIG. 11 illustrate that the fingerprint module 100 can be obtained by the method for fabricating the fingerprint module. The method for fabricating the fingerprint module includes blocks S01-S03.

At block S01, a fingerprint chip 10 including an identifying surface 11 and a connecting surface 12 opposite to the identifying surface 11 are provided, wherein the identifying surface 11 is configured to identify a fingerprint of a user. In some embodiments, the peripheral edge of the fingerprint chip 10 consists of a brittle encapsulating material 14. The encapsulating material 14 covers the chip 13. The peripheral edge of the fingerprint chip 10 is easy to be processed so as to facilitate the fingerprint chip 10 assembling onto other members. A plurality of pins 15 are disposed on the connecting surface 12 and are conducted with the chip 13, so as to facilitate electrically connection with other members by using the plurality of pins 15.

At block S02, a circuit board 20 coupled to the connecting surface 12 is provided and a sealing adhesive 30 is added between the circuit board 20 and the fingerprint chip 10. Specifically, the circuit board 20 includes: a conductive surface 23; and a peripheral side surface 24 connected to a peripheral edge of the conductive surface 23, wherein an orthographic projection of the conductive surface 23 is located in the connecting surface 12, and the sealing adhesive 30 is disposed between the connecting surface 12 and at least one of the conductive surface 23 and the peripheral side surface 24. The conductive surface 23 is electrically connected to the pins 15 by disposing the solder pads 231, such that the circuit board 20 is electrically connected to the fingerprint chip 10. Further, the sealing adhesive 30 provides a sealed environment for the solder pads 231 and the pins 15, so as to prevent the circuit board 20 and the fingerprint chip 10 therebetween from being contaminated, water permeation, or being mixed with impurities. Therefore, safety of the fingerprint module 100 is improved.

In some embodiments, the sealing adhesive 30 is an insulating adhesive. Specifically, the conductive surface 23 directly contacts the connecting surface 12 first, so as to closely connect the solder pads 231 to the pins 15. Then, the sealing adhesive 30 is added to the corner between the peripheral side surface 24 and the connecting surface 12, such that the sealing adhesive 30 is covered with the peripheral side of the solder pads 231 and the peripheral side of the pins 15. In some embodiments, the sealing adhesive 30 is a conductive adhesive. Specifically, the sealing adhesive 30 is added onto the connecting surface 30. Then, the circuit board 20 is attached to the fingerprint chip 10, i.e., the conductive surface 23 is attached onto the connecting surface 12 by the sealing adhesive 30. Finally, the circuit board 20 and the fingerprint chip 10 are pressed so as to squeeze the sealing adhesive 30. Therefore, metal molecules in the sealing adhesive 30 are conducted with the solder pads 231 and the pins 15. Thus, the sealing adhesive 30 is disposed between the connecting surface 12 and the conductive surface 23, the sealing adhesive 30 is completely covered with the solder pads 231 and the pins 15, and the sealing adhesive 30 is conducted with the solder pads 231 and the pins 15.

At block S03, a decorative ring 40 (illustrated in FIG. 12) is provided, wherein a supporting table 41 (illustrated in FIG. 12) is disposed on an inner side of the decorative ring 40; and a groove 121 is defined in a peripheral edge of the connecting surface 12 to fit the groove 121 to the supporting table 41. A peripheral edge of the fingerprint chip 10 is supported by the decorative ring 40. The fingerprint module 100 is structurally stable. Adhesive 412 (illustrated in FIG. 12) is adhered between the supporting table 41 and the groove 121. A gap between the fingerprint chip 10 and the decorative ring 40 is sealed by using the adhesive 412, so as to improve performance of waterproofing, anti-pollution, anti-impurities. Thus, safety of the fingerprint module 100 is improved.

Figure 12:
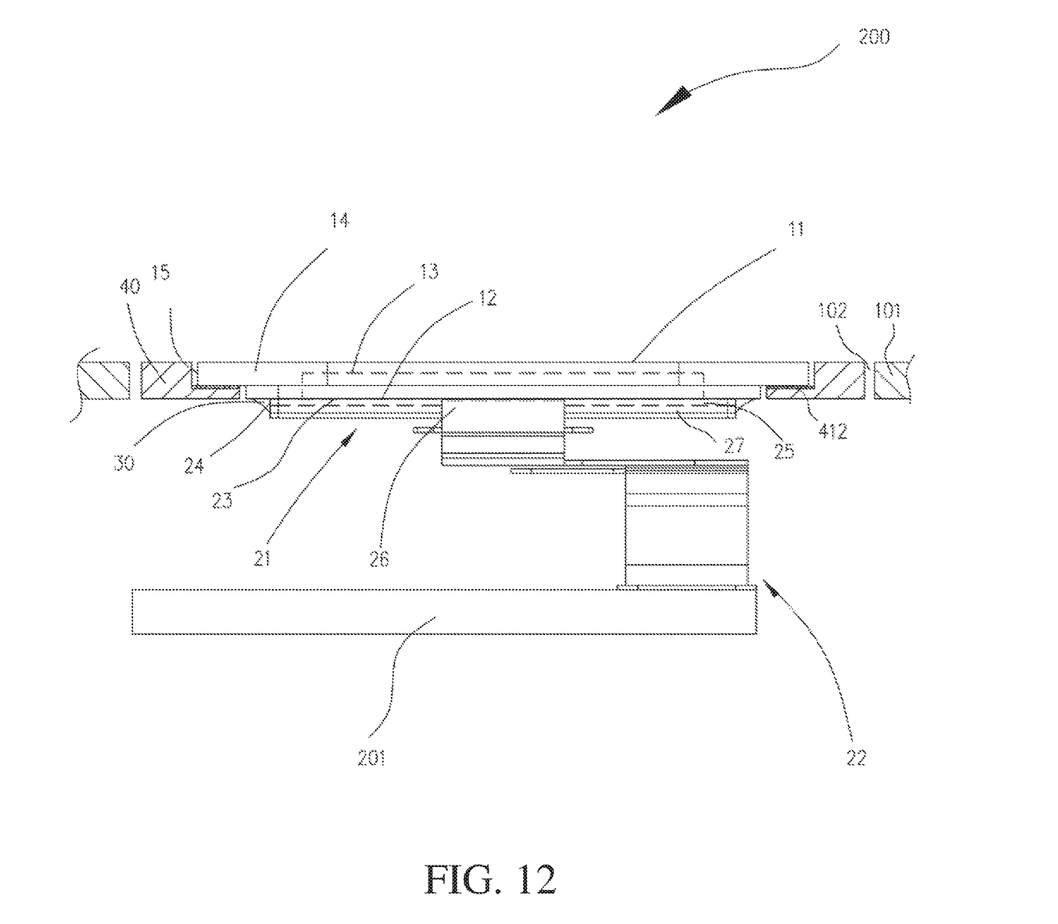
FIG. 12 is a schematic diagram illustrating a mobile terminal according to the present disclosure.

FIG. 12 illustrates that in some embodiments, a mobile terminal 200 including the fingerprint module 100 (illustrated in FIG. 1) is provided. The mobile terminal 200 further includes a case 101 and a motherboard 201. The fingerprint chip 10 (illustrates in FIG. 1) is fixed to the case 101. The identifying surface 11 faces an outer side of the case 101. The circuit board 20 is fixed in the case 101. In some embodiments, an assembly hole 102 is defined in the case 101 and the decorative ring 40 is fixed to the assembly hole 102, i.e., the fingerprint module 100 is fixed in the assembly hole 102. The motherboard 201 is fixed in the case 101 and electrically connected to the circuit board 20. Specifically, the case 101 can be a front cover of a display screen module of the mobile terminal, wherein the case 101 consists of a transparent cover plate, a touch panel and a display screen module. The decorative ring 40 can be integrally formed with the case 101, thereby stably fixing the decorative ring 40 into the assembly hole 102. After bending the extending layer 26 of the circuit board 20, the second end 22 is electrically connected to the motherboard 201, so as to achieve the fingerprint chip 10 electrically connected to the motherboard 201 via the circuit board 20. In some embodiments, the case 101 can also be a back cover of the mobile terminal 200.

In the fingerprint module, the method for fabricating the same, and the mobile terminal of the present disclosure, a sealed environment for the circuit board and the fingerprint chip is provided by attaching the circuit board to the connecting surface and disposing the sealing adhesive between the circuit board and the fingerprint chip, so as to prevent the circuit board and the fingerprint chip therebetween from being corroded, contaminated, or mixed with impurities. Therefore, safety of the fingerprint module is improved.

The present disclosure has been described with some embodiments thereof and it is understood that many changes and modifications to the described embodiments can be carried out without departing from the scope and the spirit of the disclosure that is intended to be limited only by the appended claims.

What is claimed is:

1. A fingerprint module, comprising: a fingerprint chip and a circuit board, wherein the fingerprint chip comprises an identifying surface and a connecting surface disposed opposite to the identifying surface, wherein the identifying surface faces a user for identifying a fingerprint of the user;

and wherein the circuit board is attached to the connecting surface, wherein a sealing adhesive is disposed between the circuit board and the fingerprint chip, wherein the circuit board comprises a conductive surface attached to the connecting surface, and a peripheral side surface connected to a peripheral edge of the conductive surface, wherein the conductive surface is located in an orthographic projection of the connecting surface, and the sealing adhesive is disposed between the connecting surface and at least one of the conductive surface and the peripheral side surface;

wherein the fingerprint module further comprises a decorative ring having at least one supporting table, and the at least one supporting table is disposed on an inner side of the decorative ring, and wherein at least one groove is defined by the fingerprint chip and disposed in a peripheral edge of the connecting surface, the at least one groove of the fingerprint chip fittingly receiving the at least one supporting table of the decorative ring.

2. The fingerprint module according to claim 1, wherein a plurality of pins are disposed on the connecting surface, and the conductive surface has a solder pad electrically connected to the pins, wherein the sealing adhesive covers the pins and a periphery of the solder pad, to provide a sealed environment for the pins and the solder pad.

3. The fingerprint module according to claim 2, wherein the sealing adhesive is an insulating adhesive and is disposed at a corner between the peripheral side surface and the connecting surface.

4. The fingerprint module according to claim 2, wherein the sealing adhesive is a conductive adhesive and is disposed between the conductive surface and the connecting surface.

5. The fingerprint module according to claim 1, wherein the circuit board comprises a connecting layer attached to the connecting surface; and an extending layer fixed to a peripheral edge of the connecting layer, wherein the conductive surface is disposed on the connecting layer, and the extending layer passes through the sealing adhesive located at the peripheral edge of the connecting layer, to be electrically connected to an external member.

6. The fingerprint module according to claim 5, wherein the circuit board is a flexible circuit board, a printed circuit board, or a rigid-flex circuit board.

7. A method for fabricating a fingerprint module, comprising steps of:
providing a fingerprint chip comprising an identifying surface and a connecting surface disposed opposite to the identifying surface, wherein the identifying surface faces a user for identifying a fingerprint of the user;
providing a circuit board attached to the connecting surface and adding a sealing adhesive between the circuit board and the fingerprint chip, wherein the circuit board comprises a conductive surface attached to the connecting surface, and a peripheral side surface connected to a peripheral edge of the conductive surface, wherein the conductive surface is located in an orthographic projection of the connecting surface, and the sealing adhesive is disposed between the connecting surface and at least one of the conductive surface and the peripheral side surface; and
providing a decorative ring having at least one supporting table, wherein the at least one supporting table is disposed on an inner side of the decorative ring, and wherein at least one groove is defined by the fingerprint chip and disposed in a peripheral edge of the connecting surface, the at least one groove of the fingerprint chip fittingly receiving the at least one supporting table of the decorative ring.

8. The method for fabricating the fingerprint module according to claim 7, wherein the sealing adhesive is an insulating adhesive.

9. The method for fabricating the fingerprint module according to claim 8, wherein the conductive surface is in direct contact with the connecting surface, and the sealing adhesive is added to a corner between the peripheral side surface and the connecting surface.

10. The method for fabricating the fingerprint module according to claim 7, wherein the sealing adhesive is a conductive adhesive.

11. The method for fabricating the fingerprint module according to claim 10, wherein the sealing adhesive is added onto the connecting surface, and the conductive surface is attached onto the connecting surface by the sealing adhesive.

12. The method for fabricating the fingerprint module according to claim 11, wherein the sealing adhesive is squeezed such that the circuit board and the fingerprint chip are electrically connected to each other by the sealing adhesive.

13. A mobile terminal, comprising a fingerprint module as claimed in claim 1.

14. The mobile terminal according to claim 13, wherein the mobile terminal further comprises a case, wherein the fingerprint chip is fixed on the case, the identifying surface faces an outer side of the case, and the circuit board is fixed in the case.

15. The mobile terminal according to claim 14, wherein the decorative ring is integrally formed with the case.

16. The fingerprint module according to claim 1, wherein the at least one supporting table comprises a plurality of supporting tables, and the at least one groove comprises a plurality of grooves, wherein the grooves fittingly receive the supporting tables.

17. The fingerprint module according to claim 16, wherein the plurality of grooves are equidistantly arranged at the peripheral edge of the connecting surface.

18. The fingerprint module according to claim 5, wherein the circuit board further comprises a reinforcement layer attached to a side of the connecting layer opposite to the fingerprint chip.

* * * * *